(12) United States Patent
Husemann et al.

(10) Patent No.: US 7,935,762 B2
(45) Date of Patent: May 3, 2011

(54) BIMODAL ACRYLATE PRESSURE-SENSITIVE ADHESIVE COMPOUNDS

(75) Inventors: Marc Husemann, Hamburg (DE); Stephan Zollner, Hamburg (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 12/722,816

(22) Filed: Mar. 12, 2010

(65) Prior Publication Data
US 2010/0167050 A1    Jul. 1, 2010

Related U.S. Application Data

(62) Division of application No. 10/539,865, filed as application No. PCT/EP03/13167 on Nov. 24, 2003, now Pat. No. 7,723,436.

(30) Foreign Application Priority Data

Dec. 19, 2002  (DE) .................................. 10 259 458

(51) Int. Cl.
*C08F 8/00* (2006.01)
(52) U.S. Cl. ..................... 525/191; 525/522; 526/317.1; 526/319
(58) Field of Classification Search .................. 525/191, 525/222; 526/317.1, 319
See application file for complete search history.

(56) References Cited

U.S. PATENT DOCUMENTS

| | | | |
|---|---|---|---|
| 4,501,845 A | 2/1985 | Baus et al. | |
| 4,619,979 A | 10/1986 | Kotnour et al. | |
| 4,810,523 A * | 3/1989 | Williams et al. | 427/505 |
| 4,843,134 A | 6/1989 | Kotnour et al. | |
| 5,098,959 A | 3/1992 | McGrath et al. | |
| 5,548,014 A | 8/1996 | Tse et al. | |
| 5,705,563 A | 1/1998 | Wendel et al. | |
| 5,773,155 A | 6/1998 | Kale et al. | |
| 5,863,665 A | 1/1999 | Kale et al. | |
| 6,001,931 A * | 12/1999 | Brahm et al. | 525/123 |
| 6,080,813 A | 6/2000 | Wendel et al. | |
| 6,084,018 A | 7/2000 | Wildburg et al. | |
| 6,652,963 B2 | 11/2003 | Husemann et al. | |
| 6,723,407 B2 | 4/2004 | Dollase et al. | |

FOREIGN PATENT DOCUMENTS

| | | |
|---|---|---|
| DE | 101 29 609 A1 | 1/2003 |
| DE | 101 29 608 A1 | 5/2003 |
| DE | 102 34 246 A1 | 2/2004 |
| DE | 102 56 782 A1 | 8/2004 |

* cited by examiner

*Primary Examiner* — Michael M Bernshteyn
(74) *Attorney, Agent, or Firm* — Norris McLaughlin & Marcus PA

(57) ABSTRACT

The invention relates to a polyacrylate which as a result of a polymerization process has a broad, bimodal molecular weight distribution. These acrylate pressure-sensitive adhesives are preferably processed from the melt. The low molecular weight fraction lowers the flow viscosity, while the high molecular weight fraction results in the achievement of a high shear strength, following appropriate crosslinking, for the acrylate pressure-sensitive adhesive.

4 Claims, No Drawings

BIMODAL ACRYLATE PRESSURE-SENSITIVE ADHESIVE COMPOUNDS

This application is a division of application Ser. No. 10/539,865, now U.S. Pat. No. 7,723,436, issued May 25, 2010.

The invention relates to a process for preparing a polyacrylate having an at least bimodal molecular weight distribution, to a polyacrylate obtainable by this process, and to its use.

BACKGROUND OF THE INVENTION

Within the field of pressure-sensitive adhesives (PSAs), ongoing technological developments in the coating process mean that there is a continual need for new developments. In the industry, hotmelt processes with solvent-free coating technology are of increasing importance for the preparation of PSAs, since the environmental regulations are becoming ever greater and the prices of solvents continue to rise. Consequently, solvents are to be eliminated as far as possible from the manufacturing operation for PSA tapes. As a result of the associated introduction of the hotmelt technology, the requirements imposed on the adhesives are becoming every more stringent. Acrylate PSAs in particular are the subject of very intensive investigations aimed at improvements. For high-end industrial application preference is given to polyacrylates, on account of their transparency and weathering stability. As well as these advantages, however, these acrylate PSAs must also meet exacting requirements in respect of shear strength and bond strength. This profile of requirements is matched by polyacrylates of high molecular weight and high polarity with subsequent efficient crosslinking. The drawback with these high-shear-strength, polar PSAs, however, is that they are unsuited to the operation of hotmelt extrusion, since, as a result of the high flow viscosity, high application temperatures are necessary and, moreover, the molecular weight of the polymer is reduced by shearing within the extruder. This damage significantly lowers the level of adhesive performance. The bond strength and the tack are generally low, since the glass transition temperature is relatively high because of the polar fractions in the adhesives. The shear strengths in particular of hotmelt-coated acrylate PSAs drop significantly in comparison to the original solvent-coated PSA. At the present time, therefore, various concepts are being investigated with the aim of reducing flow viscosity and hence of facilitating the extrusion coating of these PSAs.

One very important concept is the targeted adjustment of the molecular weight distribution for the purpose of improved processing. Bimodal molecular weight distributions assist easier processing, since low molecular weight fractions lower the flow viscosity while high molecular weight fractions raise the shear strength. Bimodal molecular weight distributions are generally produced by means of targeted blending. In U.S. Pat. No. 5,548,014 polyolefin blends are prepared by this method and processed in a hotmelt process. The general drawback of this method is that in two process steps the polymers, first, must be prepared, with their different average molecular weight, and subsequently must be mixed. A process for such blending of polyolefins is described in U.S. Pat. Nos. 5,863,665 and 5,773,155. It is also necessary here to introduce a relatively large amount of energy in order to mix the systems with one another, since the miscibility of polymers with one another is relatively poor, because of their long polymer chains.

Furthermore, bimodal molecular weight distributions have been disclosed for starch degradation in polyacrylate dispersions (U.S. Pat. No. 6,084,018, U.S. Pat. No. 6,080,813, U.S. Pat. No. 5,705,563). There is no connection here, though, neither with the elastomer nor with an operation of hotmelt extrusion.

U.S. Pat. No. 4,619,979 and U.S. Pat. No. 4,843,134 describe a preparation process for the solvent-free polymerization of acrylates. Here, in a specific polymerization reactor, highly branched polymers were prepared. Drawbacks are the high gel fraction formed during the polymerization, which although allowing a bimodal molecular weight distribution makes it impossible to coat such a material, and the low conversion of the polymerization, resulting in the need to remove acrylate monomers from the system again, an operation which is relatively costly and inconvenient. Since acrylate PSAs are generally composed of two or more comonomers, and these comonomers possess different boiling temperatures and vapor pressures, this is a very costly and inconvenient process.

It is an object of the invention to avoid the drawbacks which exist in the prior art and to provide a broad, bimodally distributed polyacrylate having good hotmelt processing properties while retaining good adhesive properties. The polyacrylate ought preferably to have a low residual monomer content.

This object is achieved by a polymerization process according to the main claim, and also by a polyacrylate and its use according to the coindependent claims. Advantageous developments of the invention are characterized in the dependent claims.

SUMMARY OF THE INVENTION

The invention accordingly provides a process for preparing a polyacrylate having an at least bimodal molecular weight distribution and distinguished by the fact that a monomer mixture which comprises a1) acrylic acid and/or acrylic esters of the formula $CH_2=C(R')(COOR^2)$, where $R'=H$ or $CH_3$ and $R^2$ is a linear, branched or cyclic alkyl chain having 1 to 20 carbon atoms, at 70%-100% by weight, based on the polymer, a2) olefinically unsaturated monomers containing functional groups, at 0-30% by weight, based on the polymer, is polymerized in an at least two-phase free-radical polymerization to give a polyacrylate having a broad, at least bimodal molecular weight distribution, polymerization taking place in a first phase of the at least two-phase polymerization, by means of a low initiator concentration relative to the monomer, to give a first polymer having a molecular weight which is high on average, and, before the monomer mixture has been completely consumed by reaction, a next phase of polymerization is started, by the addition at least once of a regulator, and in this further phase or further phases a further polymer is synthesized having a molecular weight which is relatively low on average.

DETAILED DESCRIPTION

By a broad, bimodally distributed polyacrylate is meant one in which a polymer or a molecular weight population ($P_1$ hereinafter) with a relatively low average molecular weight and a polymer or a molecular weight population with a relatively high average molecular weight ($P_2$ hereinafter) are present alongside one another, so that the maxima of the two molecular weight distributions are preferably at least 50 000 g/mol apart. In a preferred version the polymerization is configured in two phases and the resulting polymer possesses two pronounced molecular weight peaks in the gel permeation chromatogram, i.e., two pronounced maxima in the molecular weight distribution that are least 50 000 g/mol apart.

In one preferred embodiment the polydispersity of the polymers is greater than 6.

The at least two-phase free-radical polymerization is preferably taken to a total conversion of all polymerization phases of greater than 97%, so that the residual monomer content becomes very low.

The composition of the corresponding monomers is chosen such that the resultant adhesives possess properties of pressure-sensitive adhesion in accordance with D. Satas [Handbook of Pressure Sensitive Adhesive Technology, 1989, VAN NOSTRAND REINHOLD, New York].

The polymerization can be carried out in polymerization reactors which in general are provided with a stirrer, two or more feed vessels, reflux condenser, heating and cooling and are equipped for operation under $N_2$ atmosphere and superatmospheric pressure.

The free-radical polymerization can be carried out in the presence of an organic solvent or in mixtures of organic solvents. It is preferred to use as little solvent as possible. Depending on conversion and temperature, the polymerization time amounts to between 6 and 48 h. In the case of solution polymerization, solvents used are preferably esters of saturated carboxylic acids (such as ethyl acetate), aliphatic hydrocarbons (such as n-hexane or n-heptane), ketones (such as acetone or methyl ethyl ketone), special-boiling-point spirit or mixtures of these solvents.

For the inventive process the compounds used as polymerization initiators are customary radical-forming compounds such as peroxides and azo compounds, for example. Initiator mixtures, too, can be used. For one preferred version of the invention the molar ratio of initiator to monomer in the first phase is less than 0.005, more preferably less than 0.003. The addition of initiator in the first phase may take place in one step or in two or more steps. Initiators used with particular preference are azoisobutyronitrile (AIBN) or Vazo 67™ (DuPont).

In the second phase, regulators are added to the polymerization to lower molecular weight.

Examples of what are called polymerization regulators that can be added include alcohols, ethers, dithioethers, dithiocarbonates, trithiocarbonates, nitroxides, alkyl bromides, thiols, TEMPO and TEMPO derivatives. In one particularly preferred embodiment of the invention, isopropanol is used as a regulator. The regulator is added no earlier than after one hour's polymerization time but no later than 2 h before the end of reaction. The molecular weight distribution can be controlled with the point in time of the addition. The later the regulator is added, the lower the low molecular weight fraction of the polyacrylate becomes. The amount of regulator is guided by the efficiency, use being made of at least 0.01 weight fractions based on the monomers. For the particularly preferred regulator isopropanol, use is made of between 3 and 30, more preferably between 5 and 25, weight fractions of isopropanol, based on the monomers.

Additionally it may be of advantage that for the purpose of increasing conversion an initiator is added that possesses a crosslinking efficiency of more than 5. Examples of such initiators include Perkadox 16™ from Akzo Nobel.

The object of the invention is further achieved by means of a new polyacrylate having a broad, at least and preferably bimodal, molecular weight distribution, in which the molecular weight maxima in the molecular weight distributions of at least two polymers are preferably at least 50 000 g/mol apart. On the basis of its properties, the polyacrylate of the invention is especially suitable for use in melt coating processes and hence for the production of PSA tapes and PSA articles. It exhibits a good shear strength and a flow viscosity at moderate temperatures which is sufficient for hotmelt processing.

It may further be of advantage to blend the polymers of the invention with crosslinkers. Crosslinkers which can be used here are all difunctional or polyfunctional compounds whose functional groups are able to enter into a linking reaction with the polyacrylates, particularly addition-polymerization, polycondensation or polyaddition reactions. These reactions will preferably engage at a carboxyl group. Suitable crosslinkers are, in particular, epoxides or isocyanates having at least two functional groups, but also all other carboxyl-reactive compounds. Metal chelate compounds can also be used for this purpose.

In an advantageous embodiment of the invention, therefore, the polyacrylate contains olefinically unsaturated monomer units with functional groups in a fraction of 0-30% by weight, based on the polymer. These groups are used to control the adhesive properties.

As vinyl compounds or olefinically unsaturated monomers containing functional groups it is possible in particular to use the following: vinyl esters, vinyl ethers, vinyl halides, vinylidene halides, vinyl compounds with aromatic rings and heterocycles in a position, examples being vinyl acetate, vinylformamide, vinylpyridine, ethyl vinyl ether, vinyl chloride, vinylidene chloride, and acrylonitrile. It is preferred, moreover, to use monomers containing the following functional groups: hydroxyl, carboxyl, acid amide, isocyanato or amino groups.

As vinyl compounds containing functional groups it is also possible with great advantage to use compounds of the following structure:

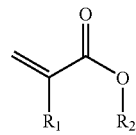

where $R_1$=H or $CH_3$ and the radical —$OR_2$ represents or includes the functional group of the PSA and does not serve as a functional group for crosslinking—with the base formed from b).

Particularly preferred examples of the vinyl compounds containing functional groups that are to be used for the purposes of the invention are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide, benzyl acrylate, benzyl methacrylate, phenyl acrylate, phenyl methacrylate, t-butylphenyl acrylate, t-butylphenyl methacrylate, phenoxyethyl acrylate, phenoxyethyl methacrylate, 2-butoxy-ethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, and dimethylacrylic acid, this enumeration not being exhaustive.

Further it is possible to use aromatic vinyl compounds, where preferably the aromatic nuclei are $C_4$ to $C_{18}$ and may also include heteroatoms. Particularly preferred examples are styrene, 4-vinylpyridine, N-vinyl-phthalimide, methylstyrene, 3,4-dimethoxystyrene, and 4-vinylbenzoic acid, this enumeration not being exhaustive.

For the preparation of PSAs the polymers are further blended, optionally, with resins. Resins which can be used are, for example, terpene resins, terpene-phenolic resins, $C_5$- and $C_9$-hydrocarbon resins, pinene resins, indene resins, and rosins, alone and also in combination with one another. In principle, however, it is possible to use all of the resins that are soluble in the corresponding polyacrylate; reference may be made in particular to all aliphatic, aromatic, and alkylaromatic hydrocarbon resins, hydrocarbon resins based on single monomers, hydrogenated hydrocarbon resins, functional hydrocarbon resins, and natural resins.

In addition it is possible to add plasticizers, various fillers (for example, carbon black, $TiO_2$, solid or hollow beads of glass or other materials, nucleators), expandants, compounding agents and/or aging inhibitors.

In one advantageous development, UV photoinitiators are added to the copolymers. Useful photoinitiators are benzoin ethers, such as benzoin methyl ether and benzoin isopropyl ether, substituted acetophenones, such as 2,2-diethoxyacetophenone (available as Irgacure 651 from Ciba Geigy), 2,2-dimethoxy-2-phenyl-1-phenylethanone, dimethoxyhydroxyacetophenone, substituted alpha-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl)oxime, for example.

The polyacrylates of the invention are coated directly from solution onto a carrier material. In one particularly preferred embodiment the polyacrylates are freed from the solvent and processed further from the melt. Concentration is carried out using with particular preference a twin-screw extruder, which is operated corotatingly or counterrotatingly.

As carrier material, for adhesive tapes for example, it is possible here to use the materials that are customary and familiar to the skilled worker, such as films (polyesters, PET, PE, PP, BOPP, PVC), nonwovens, foams, woven fabrics and woven films, and also release paper (glassine, HDPE, LDPE). This enumeration is not intended to be exhaustive.

The hotmelt PSAs of the invention are crosslinked by brief UV irradiation in the range of 200-400 nm using commercially customary high-pressure or medium-pressure mercury lamps with an output of, for example, 80 to 200 W/cm, or ionizing radiation, such as by electron-beam curing, for example. For UV crosslinking it may be appropriate to adapt the lamp output to the belt speed or, with the belt running slowly, to shade off part of the belt, in order to lower the thermal load thereon. The irradiation time is governed by the construction and output of the respective lamps.

For PSA coated from solution, the solvent is removed in a drying tunnel at elevated temperatures. The energy introduced can additionally be used for thermal crosslinking.

The invention further provides for the use of a pressure-sensitive adhesive comprising the polyacrylate of the invention.

The invention additionally provides for the use of the resultant pressure-sensitive adhesive for an adhesive tape, the acrylate pressure-sensitive adhesive being present in the form of a single-sided or double-sided film on a carrier.

EXAMPLES

The following exemplary experiments are intended to illustrate the content of the invention without wishing, through the choice of the examples, to restrict the invention unnecessarily.

Test Methods

The polyacrylate compositions and their crosslinked products were characterized by the test methods set out below.

Shear Strength (Test A)

A strip of the adhesive tape, 13 mm wide, was applied to a smooth, cleaned steel surface. The application area measured 20 mm×13 mm (length×width). Subsequent procedure was as follows:

Test A: At room temperature a 1 kg weight was fixed to the adhesive tape and the time taken for the weight to fall off was recorded.

Determination of the Gel Fraction (Test B)

The carefully dried, solvent-free adhesive samples are welded into a pouch of polyethylene nonwoven (Tyvek web). The difference in the sample weights before and after extraction with toluene gives the gel index, in other words the toluene-insoluble weight fraction of the polymer.

180° Bond Strength Test (Test C)

A strip 20 mm wide of an acrylate PSA coated onto a polyester was applied to steel plates. The PSA strip was pressed onto the substrate twice with a 2 kg weight. Immediately thereafter the adhesive tape was peeled from the substrate at 300 mm/min and at an angle of 180°. The steel plates were washed twice with acetone and once with isopropanol. The results of the measurement are reported in N/cm and are averaged from three measurements. All measurements were carried out at room temperature under controlled-climate conditions.

Gel Permeation Chromatography (Test D)

The average molecular weight M and the polydispersity PD were determined in the eluent THF used with 0.1% by volume trifluoroacetic acid. Measurement took place at 25° C. The precolumn used was PSS-SDV, 5 u, $10^3$ A, ID 8.0 mm×50 mm. Separation was carried out using the columns PSS-SDV, 5 u, $10^3$ and also $10^5$ and $10^6$ each with ID 8.0 mm×300 mm. The sample concentration was 4 g/l, the flow rate 1.0 ml per minute. Measurement was made against PMMA standards.

Determination of the Conversion (Test E)

The conversion was determined by gas chromatography and is reported as a percentage relative to the amount by weight of the monomers used. The residual monomers were determined via GC, with a calibration curve being set up for the individual monomers.

Determination of the Dynamic Flow Viscosity (Test F)

The measurements were carried out using the dynamic stress rheometer instrument from rheometrics. For sample preparation the liquid polymers were applied to a siliconized release paper carrier and dried in a drying oven at 120° C. for 10 minutes. The application rate was 100 g/m³. Strips were then cut and were laminated one on top another until the assembly has a thickness of about 1 mm. From these laminates, circular specimens with a diameter of 25 mm were cut out and the rheological measurements were carried out using these laminates. At 130° C. the frequency was varied from 0.1 to 100 rad/s. For comparison, the flow viscosities measured in each case at 1 rad/s are reported. Measurement took place with a parallel plate arrangement.

Samples Investigated

The samples used for the experiments were prepared as follows.

Example 1

A 2 L glass reactor conventional for free-radical polymerizations was charged with 20 g of acrylic acid, 380 g of 2-ethylhexyl acrylate, 133 g of special-boiling-point spirit 69/95 and 133 g of acetone. After nitrogen gas had been passed through the reaction solution with stirring for 45 minutes, the reactor was heated to 58° C. and 0.2 g of Vazo 67™ (DuPont) was added. Subsequently the external heating bath was heated to 75° C. and the reaction was carried out constantly at this external temperature. After a reaction of 2.5 h the batch was diluted with 100 g of acetone. After a reaction time of 4 h a further 0.2 g of Vazo 67™ was added. After a polymerization of 5 h the batch was diluted with 100 g of acetone, and after 6 h with 100 g of special-boiling-point spirit 60/95. After a reaction of 24 h the polymerization was terminated and the reaction vessel was cooled to room temperature. The polymer was analyzed by test methods D and E. Thereafter the polymer was freed from the solvent in a drying oven at 80° C. and then applied from the melt through a slot die at 50 g/m$^2$ to a Saran-primed PET film, cured with electron beams, with an acceleration voltage of 230 kV, and then analyzed for adhesive performance using test methods A, B, and C.

Example 2

A 2 L glass reactor conventional for free-radical polymerizations was charged with 20 g of acrylic acid, 380 g of 2-ethylhexyl acrylate, 133 g of special-boiling-point spirit 69/95 and 133 g of acetone. After nitrogen gas had been passed through the reaction solution with stirring for 45 minutes, the reactor was heated to 58° C. and 0.2 g of Vazo 67™ (DuPont) was added. Subsequently the external heating bath was heated to 75° C. and the reaction was carried out constantly at this external temperature. After a reaction time of 1 h, 20 g of isopropanol were added. After 2.5 h the batch was diluted with 100 g of acetone. After a reaction time of 4 h a further 0.2 g of Vazo 67™ was added. After a polymerization of 7 h the batch was diluted with 100 g of special-boiling-point spirit 60/95, and after 22 h with 100 g of acetone. After a reaction of 24 h the polymerization was terminated and the reaction vessel was cooled to room temperature. The polymer was analyzed by test methods D and E. Thereafter the polymer was freed from the solvent in a drying oven at 80° C. and then applied from the melt through a slot die at 50 g/m$^2$ to a Saran-primed PET film, cured with electron beams, with an acceleration voltage of 230 kV, and then analyzed for adhesive performance using test methods A, B, and C.

Example 3

A 2 L glass reactor conventional for free-radical polymerizations was charged with 60 g of acrylic acid, 380 g of 2-ethylhexyl acrylate, 133 g of special-boiling-point spirit 69/95 and 133 g of acetone. After nitrogen gas had been passed through the reaction solution with stirring for 45 minutes, the reactor was heated to 58° C. and 0.2 g of Vazo 67™ (DuPont) was added. Subsequently the external heating bath was heated to 75° C. and the reaction was carried out constantly at this external temperature. After a reaction time of 1 h, 60 g of isopropanol were added. After a reaction time of 4 h a further 0.2 g of Vazo 67™ was added. After a polymerization of 7 h and after 22 h, the batch was diluted with 100 g of acetone each time. After a reaction of 24 h the polymerization was terminated and the reaction vessel was cooled to room temperature. The polymer was analyzed by test methods D and E. Thereafter the polymer was freed from the solvent in a drying oven at 80° C. and then applied from the melt through a slot die at 50 g/m$^2$ to a Saran-primed PET film, cured with electron beams, with an acceleration voltage of 230 kV, and then analyzed for adhesive performance using test methods A, B, and C.

Example 4

A 2 L glass reactor conventional for free-radical polymerizations was charged with 20 g of acrylic acid, 380 g of 2-ethylhexyl acrylate, 133 g of special-boiling-point spirit 69/95 and 133 g of acetone. After nitrogen gas had been passed through the reaction solution with stirring for 45 minutes, the reactor was heated to 58° C. and 0.2 g of Vazo 67™ (DuPont) was added. Subsequently the external heating bath was heated to 75° C. and the reaction was carried out constantly at this external temperature. After a reaction time of 1 h, 100 g of isopropanol were added. After a reaction time of 4 h a further 0.2 g of Vazo 67™ was added. After a polymerization of 22 h, the batch was diluted with 100 g of acetone. After a reaction of 24 h the polymerization was terminated and the reaction vessel was cooled to room temperature. The polymer was analyzed by test methods D and E. Thereafter the polymer was freed from the solvent in a drying oven at 80° C. and then applied from the melt through a slot die at 50 g/m$^2$ to a Saran-primed PET film, cured with electron beams, with an acceleration voltage of 230 kV, and then analyzed for adhesive performance using test methods A, B, and C.

Example 5

A 2 L glass reactor conventional for free-radical polymerizations was charged with 20 g of acrylic acid, 380 g of 2-ethylhexyl acrylate, 133 g of special-boiling-point spirit 69/95 and 133 g of acetone. After nitrogen gas had been passed through the reaction solution with stirring for 45 minutes, the reactor was heated to 58° C. and 0.2 g of Vazo 67™ (DuPont) was added. Subsequently the external heating bath was heated to 75° C. and the reaction was carried out constantly at this external temperature. After a reaction of 2 h the batch was diluted with 100 g of acetone, and after 3 h with 100 g of special-boiling-point spirit 60/95. After a reaction time of 4 h a further 0.2 g of Vazo 67™ was added, and after a reaction time of 5 h 60 g of isopropanol were added. After a polymerization of 22 h, the batch was diluted with 200 g of acetone. After a reaction of 24 h the polymerization was terminated and the reaction vessel was cooled to room temperature. The polymer was analyzed by test methods D and E. Thereafter the polymer was freed from the solvent in a drying oven at 80° C. and then applied from the melt through a slot die at 50 g/m$^2$ to a Saran-primed PET film, cured with electron beams, with an acceleration voltage of 230 kV, and then analyzed for adhesive performance using test methods A, B, and C.

Example 6

A 2 L glass reactor conventional for free-radical polymerizations was charged with 20 g of acrylic acid, 380 g of 2-ethylhexyl acrylate, 18 g of isopropanol and 248 g of acetone. After nitrogen gas had been passed through the reaction solution with stirring for 45 minutes, the reactor was heated to 58° C. and 0.2 g of Vazo 67™ (DuPont) was added.

Subsequently the external heating bath was heated to 75° C. and the reaction was carried out constantly at this external temperature. After a reaction of 2.5 h the batch was diluted with 100 g of acetone/isopropanol (93/7). After a reaction time of 4 h a further 0.2 g of Vazo 67™ was added. After a reaction time of 5 h and after 6 h the batch was diluted with 100 g of acetone/isopropanol (93/7) each time. After a reaction of 24 h the polymerization was terminated and the reaction vessel was cooled to room temperature.

The polymer was analyzed by test methods D and E. Thereafter the polymer was freed from the solvent in a drying oven at 80° C. and then applied from the melt through a slot die at 50 g/m² to a Saran-primed PET film, cured with electron beams, with an acceleration voltage of 230 kV, and then analyzed for adhesive performance using test methods A, B, and C.

The results are described below.

Table 1 shows, for all examples, the conversions and also the results from the gel permeation chromatography.

TABLE 1

| Example | Conversion [%] Test E | $M_w$ [g/mol] Test D | $M_w/M_n$ Test D | $M_{P1}$ [g/mol] Test D | $M_{P2}$ [g/mol] Test D |
|---|---|---|---|---|---|
| 1 | 1.7 | 598 500 | 4.6 | 767 000 | — |
| 2 | 2.0 | 575 000 | 5.4 | 411 000 | 690 000 |
| 3 | 2.1 | 503 000 | 11.7 | 356 000 | 802 500 |
| 4 | 1.2 | 440 000 | 14.8 | 388 000 | 730 500 |
| 5 | 2.0 | 615 500 | 11.2 | 462 000 | 852 000 |
| 6 | 2.0 | 455 000 | 4.9 | 624 000 | — |

$M_w$ average molecular weight
$M_w/M_n$ polydispersity
$M_{P1}$ molecular weight peak in GPC for populations 1 and 2 respectively Example 1 is the reference and does not have a bimodal molecular weight distribution. In contrast, Examples 2 to 5 were prepared in a second phase with an additional regulator. The regulator added was isopropanol. In Examples 2 to 4 the point in time of addition was kept constant, at one hour after the start of reaction. In Example 5 the isopropanol was added after 4 hours from the beginning of reaction. Example 6 was run conventionally with a constant regulator fraction, and has a monomodal molecular weight distribution. As a result of the increased regulator fraction, however, the average molecular weight, at 455 000 g/mol, is relatively low here as well.

In comparison to the references, the polyacrylates prepared in two stages have a very broad bimodal molecular weight distribution. The polydispersity $M_w/M_n$ is in all cases above that of the references (Examples 1+6). Moreover, as the isopropanol regulator added goes up, there is a fall in the average molecular weight. The exception is Example 5, since in this case, because of the later addition of regulator, only the polydispersity rises. Examples 2-5 each exhibit two peaks in the GPC spectrum, with the peaks being situated significantly apart. Hence the criterion of a bimodal distribution is met.

The conversions in all examples are above 97%.

Table 2 below lists the adhesive properties of the individual examples and compares them with one another.

TABLE 2

| Example | EB dose [kGy] | Gel index [%] (Test B) | HP 1ON, RT [min] (Test A) | BSS [N/cm] (Test C) |
|---|---|---|---|---|
| 1 | 40 | 40 | 1355 | 4.0 |
| 2 | 40 | 37 | 1280 | 4.6 |
| 3 | 70 | 38 | 1370 | 4.8 |
| 4 | 100 | 35 | 1195 | 5.0 |
| 5 | 50 | 42 | 1645 | 4.9 |
| 6 | 90 | 39 | 255 | 4.4 |

HP: holding power
BSS. bond strength steel
EB. electron beams

In order to attain optimum crosslinking, crosslinking was carried out with different doses. The lower the average molecular weight of the PSA, the higher must be the applied EB dose in order to attain optimum and efficient crosslinking. In this way it is possible to generate PSAs possessing shear strength. Examples 1 to 5 in Table 2 demonstrate that the differences in terms of shear strength are very small if it is ensured that the gel index is situated on a level. Conversely the differences in the bond strengths are significantly greater, since in this case—probably as a result of the greater low molecular weight fraction—the adhesion to the substrate increases. Example 6 shows a significantly lower shear strength, probably because the high molecular weight fraction is too low for a cohesive acrylate PSA.

For coating as a hotmelt the dynamic flow viscosity is critical. For all of the examples, therefore, for comparison, the flow viscosity was measured using the rheometer. The results are set out in Table 3.

TABLE 3

| Example | $\eta$ [Pa s] at 1 rad/s and 130° C. (Test F) |
|---|---|
| 1 | 15 525 |
| 2 | 10 245 |
| 3 | 8475 |
| 4 | 6690 |
| 5 | 11 425 |
| 6 | 12 480 |

$\eta$: flow viscosity at 1 rad/s

As a result of the monomodal molecular weight distribution the flow viscosity of Example 1 is at a very high level. In comparison to this, the flow viscosity in Examples 2 to 5 falls off markedly as a result of the broad bimodal distribution. These adhesives can therefore be processed much more simply by a hotmelt operation, since the temperatures that must be employed are lower and the polymers receive less damage. Furthermore, with these pressure-sensitive adhesives, a virtually identical profile of adhesive properties is achieved, the broader molecular weight distribution being compensated by irradiation with a higher EB dose. Example 6 shows that, as a result of the lower average molecular weight, there is likewise a fall in the flow viscosity, but in terms of adhesive properties (particularly the shear strength) no longer matches the broad bimodally distributed PSAs.

We claim:

1. A pressure-sensitive adhesive comprising a polyacrylate obtained by the process of
   polymerizing a monomer mixture of
   a1) 70% to 100% by weight acrylic acid and/or acrylic esters of the formula $CH_2=C(R')(COOR^2)$, where $R'=H$ or $CH_3$ and $R^2$ is an alkyl chain having 1 to 20 carbon atoms, and
   a2) 0 to 30% by weight olefinically unsaturated monomers containing functional groups,
   in an at least two-phase free-radical solvent polymerization in the presence of an organic solvent or in mixtures of organic solvents to give a polyacrylate having an at least bimodal molecular weight distribution, the polymerization being carried out in a first phase of the at least two-phase polymerization, in the presence of a first initiator concentration, to give a first polymer having a first molecular weight and, before the monomer mixture has been completely consumed by the polymerization, a further phase or phases of polymerization is or are started, by the addition at least once of a regulator, and in this further phase or further phases a second polymer or polymers is or are synthesized, said second polymer having a second molecular weight which second molecular weight is lower than said first molecular weight.

2. The pressure-sensitive adhesive of claim 1, wherein the olefinically unsaturated monomers containing functional groups are selected from the group consisting of maleic anhydride, vinyl acetate, acrylamides, and double-bond-functionalized photoinitiators containing functional groups.

3. The pressure-sensitive adhesive of claim 1 further comprising crosslinkers, photoinitiators, resins, plasticizers, fillers, expandants, compounding agents and/or aging inhibitors.

4. An adhesive tape comprising the pressure-sensitive adhesive of claim 1 on one or both sides of a carrier film.

* * * * *